(12) United States Patent
Okamoto et al.

(10) Patent No.: US 8,163,334 B2
(45) Date of Patent: Apr. 24, 2012

(54) METHOD AND APPARATUS FOR APPLYING ELECTRODE MIXTURE PASTE

(75) Inventors: Toru Okamoto, Kanagawa (JP); Hiroyuki Usui, Kanagawa (JP); Shinichi Nishida, Kanagawa (JP)

(73) Assignee: Panasonic Corporation, Osaka (JP)

( * ) Notice: Subject to any disclaimer, the term of this patent is extended or adjusted under 35 U.S.C. 154(b) by 854 days.

(21) Appl. No.: 11/920,124

(22) PCT Filed: Apr. 26, 2006

(86) PCT No.: PCT/JP2006/308742
§ 371 (c)(1),
(2), (4) Date: Oct. 2, 2008

(87) PCT Pub. No.: WO2006/120907
PCT Pub. Date: Nov. 16, 2006

(65) Prior Publication Data
US 2009/0104344 A1  Apr. 23, 2009

(30) Foreign Application Priority Data
May 9, 2005 (JP) ................................ 2005-135546

(51) Int. Cl.
*B05D 3/12* (2006.01)
*B21C 47/00* (2006.01)
*C23C 14/56* (2006.01)

(52) U.S. Cl. ..... 427/178; 427/115; 427/118; 427/126.6; 427/201; 427/383.1; 427/434.5; 427/435

(58) Field of Classification Search ............... 427/115, 427/178, 201, 383.1, 434.5, 435, 118, 126.6
See application file for complete search history.

(56) References Cited

U.S. PATENT DOCUMENTS

| | | | |
|---|---|---|---|
| 3,238,059 A * | 3/1966 | Stobierski | 427/345 |
| 4,582,098 A | 4/1986 | Matsumoto et al. | |
| 7,909,068 B2 * | 3/2011 | Nakai et al. | 141/1.1 |
| 2008/0261105 A1 * | 10/2008 | Okawa et al. | 429/94 |

FOREIGN PATENT DOCUMENTS

| | | |
|---|---|---|
| CN | 1373527 | 10/2002 |
| JP | 62-105363 | 5/1987 |

(Continued)

OTHER PUBLICATIONS

Chinese Office Action issued in Chinese Patent Application No. 2006800158466, dated Aug. 28, 2009.

*Primary Examiner* — Linda L Gray
(74) *Attorney, Agent, or Firm* — McDermott Will & Emery LLP

(57) ABSTRACT

A method for applying an electrode mixture paste includes unwinding a core material wound in a coil shape; applying an electrode mixture paste to both sides of the core material; adjusting an application amount of the electrode mixture paste; drying a paste-coated sheet with the electrode mixture paste applied to the both sides thereof; and winding the paste-coated sheet in a coil shape. The electrode mixture paste is circulated and supplied by a circulation means having a storage function and a stirring function. The application method can achieve stable application accuracy even when a paste-coated sheet is continuously produced using a plurality of lots of electrode mixture pastes containing different types of powders having a large difference in the specific gravity.

2 Claims, 2 Drawing Sheets

FOREIGN PATENT DOCUMENTS

| | | |
|---|---|---|
| JP | 9-035709 | 2/1997 |
| JP | 09-204917 | 8/1997 |
| JP | 10-223217 | 8/1998 |
| JP | 2000-243384 | 9/2000 |
| JP | 2000-323138 | 11/2000 |
| JP | 2001-076708 | 3/2001 |
| JP | 2001-149840 | 6/2001 |
| JP | 2003-170104 | 6/2003 |

* cited by examiner

METHOD AND APPARATUS FOR APPLYING ELECTRODE MIXTURE PASTE

RELATED APPLICATIONS

This application is the U.S. National Phase under 35 U.S.C. §371 of International Application No. PCT/JP2006/308742, filed on Apr. 26, 2006, which in turn claims the benefit of Japanese Application No. 2005-135546, filed on May 9, 2005, the disclosures of which Applications are incorporated by reference herein.

TECHNICAL FIELD

The present invention relates to a method and an apparatus for applying an electrode mixture paste to a core material made of porous metal thin plate to obtain a paste-coated sheet. In particular, the invention relates to stabilization of the accuracy of paste application.

BACKGROUND ART

Batteries such as alkaline storage batteries and lithium ion secondary batteries are widely used as the power source for portable devices, machine tools, or electric vehicles. Of these, nickel metal-hydride storage batteries have a relatively high energy density and excellent durability, and the applications thereof, including as power sources for electric vehicles, are being expanded.

Generally, the main components of nickel metal-hydride storage batteries include: a positive electrode formed by filling a three-dimensional metal porous material with nickel hydroxide and other materials; and a negative electrode formed by applying an electrode mixture paste composed of a hydrogen-absorption alloy and other materials to porous metal thin plate (hereinafter simply abbreviated as a "core material") such as a punched metal. Of these two, the negative electrode can be produced continuously because of the nature of its production process, which has received attention as a highly efficient process. Specifically, a method has been proposed in which, after the core material is immersed in the electrode mixture paste, the application amount of the electrode mixture paste is adjusted to produce a paste-coated sheet.

For example, a mixture paste of a negative electrode for nickel metal-hydride storage batteries contains a hydrogen-absorption alloy having a high specific gravity of approximately 8 g/ml. Therefore, in this case, the hydrogen-absorption alloy sediments over time. As the sedimentation proceeds, only the supernatant of the electrode mixture paste is applied to a core material. Therefore, the composition of the applied material is not uniform, and at the same time the application amount decreases over time. In order to avoid this, for example, the following methods have been proposed: a method in which a kneaded paste is left to stand for a predetermined period of time to temporarily increase the viscosity and thereafter is kneaded again (for example, Patent Document 1); a method in which a paste is stirred at a constant temperature and thereafter is subjected to aging in a stored state (for example, Patent Document 2); and a method in which a paste bath having a stirring function is provided at a area adjacent to an application position (for example, Patent Document 3). In addition to these, it may be effective to evolve, for example, the following methods, although these are examples for other battery systems: a method in which stirring means is provided right at an application position (for example, Patent Documents 4 and 5); and a method in which a paste is ultrasonically dispersed while being circulated (for example, Patent Document 6).

[Patent Document 1] Japanese Patent Laid-Open Publication No. 9-204917
[Patent Document 2] Japanese Patent Laid-Open Publication No. 9-035709
[Patent Document 3] Japanese Patent Laid-Open Publication No. 2000-323138
[Patent Document 4] Japanese Patent Laid-Open Publication No. 2000-243384
[Patent Document 5] Japanese Patent Laid-Open Publication No. 2001-076708
[Patent Document 6] Japanese Patent Laid-Open Publication No. 10-223217

DISCLOSURE OF THE INVENTION

Problems to be Solved by the Invention

For example, a mixture paste of a negative electrode for nickel metal-hydride batteries contains, in addition to a hydrogen-absorption alloy having a high specific gravity, a powder (for example, such as a rare-earth metal oxide or carbon black) having a specific gravity greatly different from that of the hydrogen-absorption alloy. In this case, when undue external stress is applied to such an electrode mixture paste containing different types of powders with a large difference in the specific gravity in the manner as shown in Patent document 4, 5, or 6, the above powders of different types are separated since the affinity therebetween is poor. Accordingly, the stability of the paste rather decreases, and the application accuracy is reduced significantly.

When the method of Patent Document 1, 2 or 3 is used, the above apprehensions can be avoided. However, the coating properties of the electrode mixture paste are slightly different from kneading lot to kneading lot. Therefore, when a paste-coated sheet is continuously produced for a long period of time, the application amount of the paste varies each time the kneaded lot is changed, and therefore the application accuracy is also not stable.

The present invention has been made in view of the foregoing problems. Accordingly, it is an object of the invention to provide an electrode mixture paste application method which provides stable application accuracy even when a paste-coated sheet is continuously produced using a plurality of lots of electrode mixture pastes containing different types of powders having a large difference in the specific gravity.

Means for Solving the Problems

In order to solve the above problems, the present invention provides a method for applying an electrode mixture paste. The method includes: a first step of unwinding a core material wound in a coil shape; a second step of applying an electrode mixture paste to both sides of the core material; a third step of adjusting an application amount of the electrode mixture paste; a fourth step of drying a paste-coated sheet with the electrode mixture paste applied to the both sides thereof; and a fifth step of winding the paste-coated sheet in a coil shape, wherein, in the second step, the electrode mixture paste is circulated and supplied by circulation means, and wherein the circulation means has a storage function and a stirring function.

As means for realizing the above-described application method, the present invention provides an apparatus for applying an electrode mixture paste. The apparatus includes: an uncoiler unit for unwinding a core material wound in a coil shape; an immersion unit for immersing the coil material in an electrode mixture paste; an application amount adjusting unit for adjusting an application amount of the electrode mixture paste; a drying unit; and a coiler unit for winding a paste-coated sheet, after applying and drying, in a coil shape, wherein the immersion unit includes circulation means for circulating and supplying the electrode mixture paste and supplying the electrode mixture paste to the immersion unit, and wherein the circulation means has a storage function and a stirring function.

The application accuracy can be significantly improved by circulating an electrode mixture paste sedimenting in the immersion unit by the circulation means and at the same time by supplying to the immersion unit an electrode mixture paste which is homogenized while being prevented from separation by means of the stirring function provided, in the circulation means, together with the storage function capable of storing a plurality of lots of electrode mixture pastes.

BEST MODE FOR CARRYING OUT THE INVENTION

Hereinbelow, the best mode for carrying out the invention will be described in detail with reference to the drawings.

Figure 1:
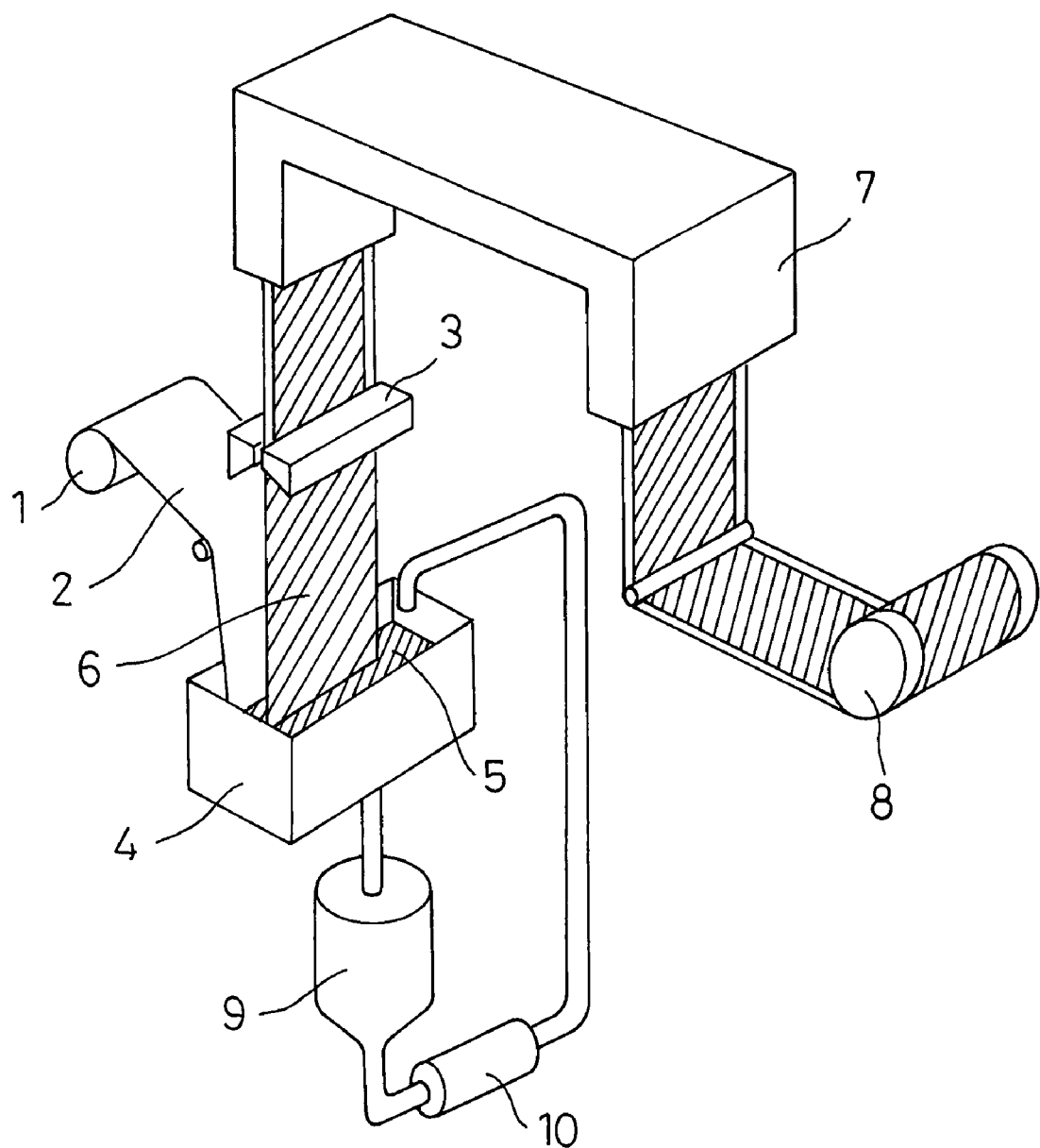
FIG. 1 is a schematic view of an apparatus for applying electrode mixture paste in accordance with the present invention.

FIG. 1 is a schematic view of an apparatus for applying electrode mixture paste in accordance with the present invention. A coil-shaped core material 2 made of porous metal thin plate is unwound by an uncoiler unit 1. Subsequently, the core material 2 is introduced into an immersion unit 4 filled with an electrode mixture paste 5, and the electrode mixture paste 5 is applied onto the core material 2. Next, the core material 2 passes through an application amount adjusting unit 3 to form a paste-coated sheet 6. Then, the paste-coated sheet 6 is introduced into a drying unit 7 and thereafter is wound in a coil shape on a coiler unit 8. In this case, the electrode mixture paste 5 stored in the immersion unit 4 is circulated and supplied by circulation means (including a stock tank 9 and a pump 10).

Figure 2:
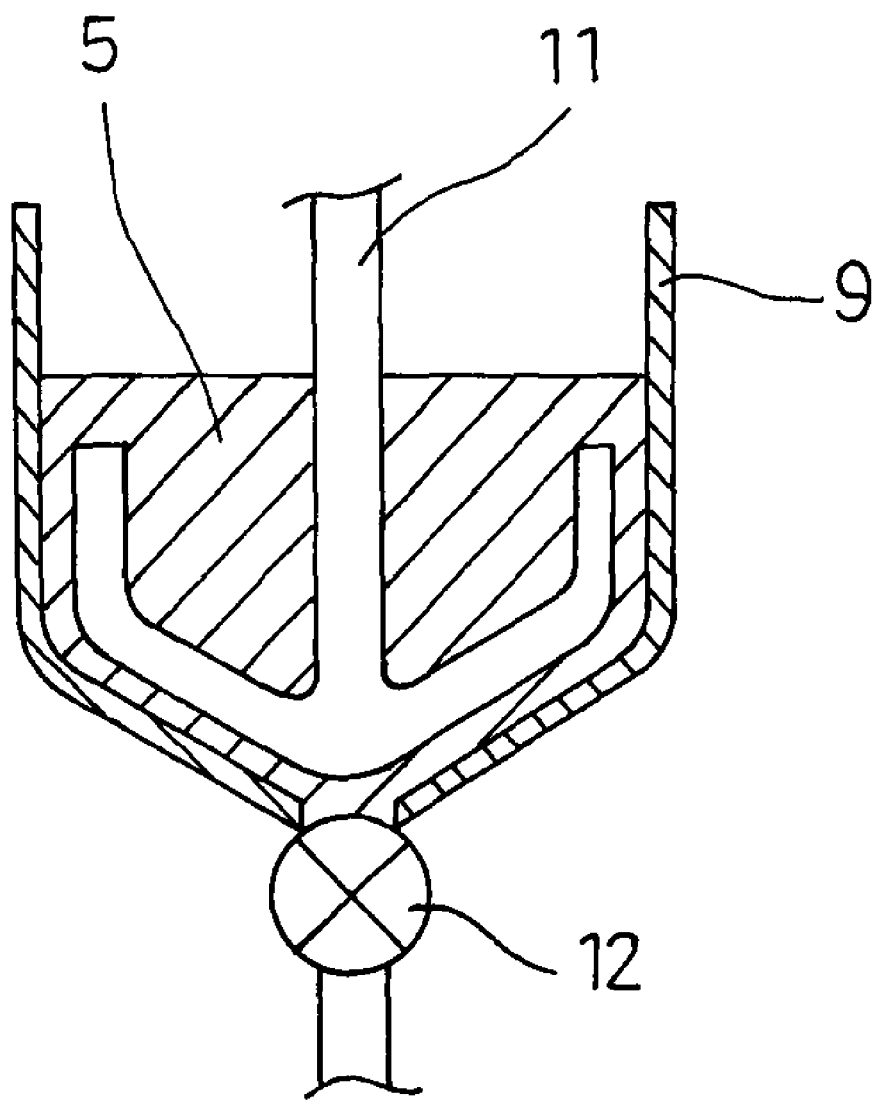
FIG. 2 is a schematic cross-sectional view of a stock tank in the apparatus of the present invention.

FIG. 2 is a schematic cross-sectional view of the stock tank (being a storage function for the electrode mixture paste) 9. A stirring blade (being a stirring function for the electrode mixture paste) 11 is disposed inside the stock tank 9. With the rotation of the stirring blade 11, the electrode mixture paste 5 returned from the immersion unit 4 is mixed uniformly with an additional electrode mixture paste 5 of a different kneading lot, thereby keeping the properties of the paste constant. This uniform electrode mixture paste 5 is returned to the immersion unit 4 by appropriately opening or closing a valve 12. In this manner, even when the paste-coated sheet 6 is continuously produced, high application accuracy can be maintained. As used herein, the different kneading lot refers to that electrode mixture pastes 5 used in this method are manufactured by a plurality of apparatuses or by a plurality of manufacturers.

In terms of re-forming the sedimentary powders into a uniform paste, it is preferable that the stirring blade 11 have a shape following the bottom shape of the stock tank 9. Moreover, it is desirable that the rotation speed of the stirring blade 11 is moderately slow. Specifically, in terms of preventing both the sedimentation and separation of the electrode mixture paste 5, it is desirable that the average peripheral speed of the blade is 0.2 to 3.0 m/min. As used herein, the average rotation speed refers to an average rotation speed of the intermittent rotation of the stirring blade 11 since the stirring blade 11 is rotated at high and low speeds in an intermittently repeated manner.

Hereinbelow, the comparison results between Example of the present invention and Comparative Example are described using a negative electrode (a hydrogen-absorption alloy electrode) for a nickel metal-hydride storage battery. Of course, the present invention is not limited to Example, so long as the core material is porous metal thin plate. The invention can be applied to a sintered substrate which is a precursor of a sintered nickel positive electrode for an alkaline storage battery and to positive and negative electrodes for a lithium polymer battery in which a metal lath is used as the porous metal thin plate.

EXAMPLE

A hydrogen-absorption alloy represented by a chemical formula of $MmNi_{3.55}Co_{0.75}Mn_{0.4}Al_{0.3}$ was pulverized into particles, having an average diameter of 30 μm, in water using a wet ball-mill, thereby obtaining the hydrogen-absorption alloy powder. The alloy powder was immersed in an alkali aqueous solution for surface treatment. Subsequently, for each batch, 2 kg of an aqueous solution of carboxymethyl cellulose (solid content ratio: 1.5%) and 0.08 kg of Ketjen black were added to 20 kg of the hydrogen-absorption alloy powder, and the mixture was kneaded. Furthermore, 0.35 kg of an aqueous solution of styrene-butadiene copolymer rubber particles (solid content ratio: 40%) was added thereto, and the resultant mixture was stirred, thereby producing an electrode mixture paste 5. A total of five batches of the electrode mixture paste 5 were produced. The viscosities of these were measured using a B-type viscometer, and were 220, 233, 228, 215, and 236 ps, respectively.

The electrode mixture paste 5 of the first batch was supplied to the immersion unit 4 having an inner volume of 20 L, and those of the remaining four batches were supplied to the stock tank 9 having an inner volume of 80 L. Then, the electrode mixture paste 5 was applied to both sides of a core material 2 (the overall length of one coil: 500 m) and dried at a rate of 5 m/min, while the electrode mixture paste 5 was shaved off from an area within 20 mm from each of the edges so as to obtain a coated width of 260 mm and an overall thickness after application of 260 μm, thereby producing a paste-coated sheet 6. In this instance, the core material 2 was made of an iron-made punched metal plated with nickel and having a thickness of 60 μm, a width of 300 mm, a punched hole diameter of 1 mm, and a pore rate of 42%. The valve 12 provided in the stock tank 9 was repeatedly opened and closed at intervals of 1 minute in such a manner that it was interlocked with a valve (not shown) provided in the immersion unit 4. The electrode mixture paste 5 was returned to the stock tank 9 at a processing rate of 2 L/min when the valves were opened. At the same time, the electrode mixture paste 5 was supplied from the stock tank 9 by the pump 10 such that the amount of the electrode mixture paste 5 in the immersion unit 4 was maintained constant at 12 L. Moreover, the stirring blade 11 in the stock tank 9 was rotated at an average peripheral speed of 1 m/min.

After the application over a length of 480 m, a paste-coated portion in the paste-coated sheet 6 was punched with a 30 mm diameter punch at six positions in the width direction at intervals of 20 m in length, and the application amount of the electrode mixture paste 5 after drying was determined. A weight deviation σ1 in the width direction (a standard deviation represented by percent by weight) was determined at a time after the application over a length of 480 m. Meanwhile, a weight deviation σ2 in the length direction was determined by averaging the application amounts in the width direction at intervals of 20 m and expressing the standard deviation of the average values in terms of percent by weight. The results were σ1=0.07% and σ2=0.09%.

Comparative Example 1

The same procedure as in Example was repeated to produce a paste-coated sheet 6, except that the circulation means (including the stock tank 9 and the pump 10) was not used and that an operation was repeated in which, when the amount of the electrode mixture paste 5 of the first lot was reduced, the electrode mixture paste 5 of the second lot was added such that the amount of the electrode mixture paste 5 in the immersion unit 4 was kept constant at 12 L.

After the application over a length of 480 m, the weight deviations σ1 and σ2 in the width and length directions, respectively, were determined as in Example 1, and the results were σ1=0.06% and σ2=0.78%.

Comparative Example 2

The same procedure as in Example was repeated to produce a paste-coated sheet 6, except that the stirring blade 11 in the stock tank 9 was not rotated and that a propeller having a size enough to prevent the contact with both the paste-coated sheet 6 and the inner wall of the immersion unit 4 was disposed in the immersion unit 4 and was rotated at an average peripheral speed of 15 m/min.

After the application over a length of 480 m, the weight deviations σ1 and σ2 in the width and length directions, respectively, were determined as in Example 1, and the results were σ1=0.36% and σ2=1.12%.

When the electrode mixture paste 5 was added on a kneading lot by kneading lot basis as described in Comparative Example 1, the application accuracy in the length direction was reduced due to the lot-to-lot fluctuation in properties of the paste. Furthermore, when the stirring mechanism for the electrode mixture paste 5 was provided in the immersion unit 4 and excessive stirring was carried out as described in Comparative Example 2, the powders having a large difference in the specific gravity were separated from each other. This resulted in a reduction of not only the application accuracy in the length direction but also that in the width direction. In Comparative Example 2, when the peripheral speed was reduced to a level similar to that in Example, it was observed even visually that the electrode mixture paste 5 was stirred only in a part of the immersion unit 4, and no advantageous effect was obtained.

As can be seen from the above results, when a paste-coated sheet is continuously produced using a plurality of lots of electrode mixture pastes containing different types of powders having a large difference in the specific gravity, stable application accuracy is obtained only when the method of Example of the present invention is used.

INDUSTRIAL APPLICABILITY

As has been described, according to the present invention, an electrode mixture paste can be stably produced continuously at high application accuracy. Therefore, the invention is highly useful and can be widely used as a technique capable of manufacturing electrodes for various batteries including nickel metal-hydride storage batteries with high productivity.

The invention claimed is:

1. An electrode mixture paste application method for applying an electrode mixture paste containing different types of powders including a hydrogen-absorption alloy powder on a core material made of porous metal thin plate while traveling the core material, the method comprising:
   a first step of unwinding the core material wound in a coil shape;
   a second step of applying the electrode mixture paste to both sides of the core material;
   a third step of adjusting an application amount of the electrode mixture paste;
   a fourth step of drying a paste-coated sheet with the electrode mixture paste applied to the both sides thereof; and
   a fifth step of winding the paste-coated sheet in a coil shape,
   wherein, in the second step, the electrode mixture paste is circulated and supplied by circulation means, and
   wherein the circulation means has a storage function and a stirring function a rotation speed of which is 0.2 to 3.0 m/min as a peripheral speed.

2. The electrode mixture paste application method according to claim 1, wherein the electrode mixture paste further contains carbon black.

* * * * *